US005600753A

United States Patent [19]
Iso

[11] Patent Number: 5,600,753
[45] Date of Patent: Feb. 4, 1997

[54] SPEECH RECOGNITION BY NEURAL NETWORK ADAPTED TO REFERENCE PATTERN LEARNING

[75] Inventor: Ken-ichi Iso, Tokyo, Japan

[73] Assignee: NEC Corporation, Tokyo, Japan

[21] Appl. No.: 270,416

[22] Filed: Jul. 5, 1994

Related U.S. Application Data

[63] Continuation of Ser. No. 873,153, Apr. 24, 1992, abandoned.

[30] Foreign Application Priority Data

Apr. 24, 1991 [JP] Japan ................................ 3-119086

[51] Int. Cl.$^6$ ............................... G01L 1/06; G06F 15/00
[52] U.S. Cl. ......................... 395/2.09; 395/2.4; 395/2.41
[58] Field of Search .......................... 381/41–45; 395/2, 395/2.41, 2.11, 2.68; 382/15

[56] References Cited

U.S. PATENT DOCUMENTS

| | | | |
|---|---|---|---|
| 4,587,670 | 5/1986 | Levinson et al. | 381/43 |
| 4,805,225 | 2/1989 | Clark | 382/15 |
| 4,852,180 | 7/1989 | Levinson | 381/43 |
| 4,876,731 | 10/1989 | Loris et al. | 382/15 |
| 4,975,961 | 12/1990 | Sakoe | 381/43 |

OTHER PUBLICATIONS

Lippmann, "Review of Neural Networks for Speech Recognition," Neural Computation, 1989, pp. 1–38.
Sakoe et al. "Speaker–Independent Word Recognition Using Dynamic Programming Neural Networks", IEEE, ICASSP '89, 1989, S7, 8 pp. 29–32.
Tsuboka et al, "Neural Predictive Hidden Markov Model", Matsushita Electric Industrial Co. & Osaka University Paper, Dec. 1990, pp. 1341–1344.
S. Levinson, "Structural Methods in Automatic Speech Recognition", Proceedings of the IEEE, vol. 73, No. 11, Nov. 1985, pp. 1625–1650.
K. Funahashi, "On the Approximate Realization of Continuous Mappings by Neural Networks", Neural Networks, vol. 2, 1989, pp. 183–192.
R. Lippmann, "An Introduction to Computing with Neural Nets", IEEE ASSP Magazine, Apr. 1987, pp. 4–22.
K. Iso et al, "Speaker–Independent Word Recognition Using a Neural Prediction Model", Proceedings of the ICASSP 90 –1990 Int'l Conf. on Acoustics, Speech, and Signal Processing, Apr. 1990, pp. 441–444.
K. Shikano et al., "Speaker Adaptation Through Vector Quantization", 1986, pp. 2643–2646, ICASSP 86, IEEE.
H. Sakoe et al., "Dynamic Programming Algorithm Optimization for Spoken Word Recognition", IEEE Transactions on Acoustics, Speech, and Signal Processing, vol. ASSP–26, No. 1, Feb. 1978, pp. 43–49.
ICASSP '91 (1991 International Conference on Acoustics, Speech, And Signal Processing, Toronto, Ontario, 14th–17th May 1991), vol. 1, pp. 57–60, IEEE, New York; K. Iso et al.: "Large vocabulary speech recognition using neural prediction model".

*Primary Examiner*—Allen R. MacDonald
*Assistant Examiner*—Indranil Chowdhury
*Attorney, Agent, or Firm*—Sughrue, Mion, Zinn, Macpeak & Seas

[57] ABSTRACT

A speech recognition method according to the present invention uses distances calculated through a variance weighting process using covariance matrixes as the local distances (prediction residuals) between the feature vectors of input syllables/sound elements and predicted vectors formed by different statuses of reference neural prediction models (NPM's) using finite status transition networks. The category to minimize the accumulated value of these local distances along the status transitions of all the prediction models is figured out by dynamic programming, and used as the recognition output. Learning of the reference prediction models used in this recognition method is accomplished by repeating said distance calculating process and the process to correct the parameters of the different statuses and the covariance matrixes of said prediction models in the direction of reducing the distance between the learning patterns whose category is known and the prediction models of the same category as this known category, and what have satisfied prescribed conditions of convergence through these calculating and correcting processes are determined as reference pattern models.

2 Claims, 11 Drawing Sheets

SPEECH RECOGNITION BY NEURAL NETWORK ADAPTED TO REFERENCE PATTERN LEARNING

This is a continuation of application Ser. No. 07/873,153 filed Apr. 24, 1992, now abandoned.

BACKGROUND OF THE INVENTION

1. Field of the Invention

The present invention relates to a speech recognition method, and more particularly to a speech recognition method manifesting a high rate of recognition without requiring learning with a particularly large quantity of training data.

2. Description of the Prior Art

Speech signals are expressed in time series patterns of feature vectors, and speech recognition is based on the degree of identity between a reference pattern representing a known piece of speech and the pattern of the input speech signal. For these time series patterns, the Hidden Markov Model (HMM) is extensively used as described in detail in the specifications of the U.S. Pat. Nos. 4,587,670 and 4,582,180. The HMM itself will not be explained in detail here because its detailed description can be found in S. E. Levinson, "Structural Method in Automatic Speech Recognition", Proc. IEEE, 73, No 11 1985, pp 1625–1650, besides said U.S. Patents.

The HMM assumes that the time series of feature vectors are generated by the Markov probability process. The standard patterns of the HMM are represented in a plurality of statuses and transitions between the statuses, and each status outputs a feature vector according to a predetermined distribution of probability density while each transition between statuses is accompanied by a predetermined probability of transition. The likelihood, which represents the degree of matching between the input pattern and a reference pattern, is given by the probability of the Markov probability model to generate a series of input pattern vectors. The probability of transition between statuses and the parameter to define the function of probability density distribution, which characterize each reference pattern, can be determined with the Baum Welch algorithm using a plurality of sets of vocalization data for the training purpose.

However, the Baum Welch algorithm, which is a statistical learning method, requires a large quantity of training data to determine the parameters of the model corresponding to reference patterns. Therefore, the load of vocalization is extremely great when a speech recognition apparatus begins to be newly used, and this presents a serious obstacle to the practical use of such apparatuses. Therefore, with a view to reducing this load, a number of speaker-adaptive methods have already been proposed to adapt a speech recognition apparatus to the speaker with a relatively small quantity of training data.

A speaker-adaptive method defines the similarity of acoustic events according to reference patterns corresponding to known speech signals and a new speaker's vocalization data for adaptation, basically using the physical distance between feature vectors as the scale, and carries out adaptation by estimating, on the basis of that similarity, the parameters of the model corresponding to acoustic events absent in the vocalization data for adaptation.

However, such a method of adaptation based on an estimation relying solely on physical distances, though providing a somewhat higher rate of recognition than before the adaptation, is far less effective in recognition than a method using reference patterns corresponding to a specific speaker, consisting of a large quantity of speech data. (For further details, see K. Shikano, K. F. Lee and R. Reddy, "Speaker Adaptation through Vector Quantization", Proc. ICASSP-86, Tokyo, 1986, pp. 2643–2646.)

Meanwhile, as means for improving the rate of recognition, the inventors of the present invention proposed a pattern recognition method based on the prediction of the aforementioned time series patterns. Using multilayer perceptrons (MPL's) based on a neural network as predictive means for the time series patterns, the outputs of the MLP's constitute reference patterns. The inventors named the reference patterns the "neural prediction model" (NPM). This NPM will not be described in detail here as its detailed explanations can be found in K. Iso and T. Watanabe, "Speaker-Independent Word Recognition Using a Neural Prediction Model," Proc. ICASSP-90, New Mexico, 1990, p. 441–444 and the pending U.S. Ser. No. (07-521625). In the NPM described in these references, a predictor (MLP) in the nth status of a reference pattern model consisting of a finite status transition network calculates a predicted for the feature vector of the input patterns at time t from a plurality of feature vectors at time t−1 and before. The distance between this predicted vector and the feature vector of the input pattern at time t is supposed to be the local distance between said two feature vectors. In the NPM described in the above cited references, the squared distance or the like between the vectors is used as this local distance.

BRIEF SUMMARY OF THE INVENTION

1. Object of the Invention

An object of the present invention is to reduce, in relative terms, the contributions of components inferior in predictive accuracy (i.e. more fluctuating) out of the components of said predicted vectors, thereby increase the predictive accuracy of the predictor and improve the accuracy of recognition by the NPM.

2. Summary of the Invention

A pattern recognition method according to the invention recognizes the time series patterns of feature vectors representing input speech signals by using the NPM constituting said finite status transition network. Each status of this finite status transition network has a predictor for calculating a predicted vector from a plurality of feature vectors of the input time series patterns at time t−1 and before and a plurality of feature vectors at time t+1 and after. This predicted vector is compared with the feature vector of the input time series patterns at time t. As said local distance indicated by the result of this comparison, i.e. the local distance between the feature vector of the input time series patterns at time t (input feature vector) and the nth status of the finite status transition network (predicted feature vector), there is used the prediction residual calculated from the input feature vector, the predicted feature vector and a covariance matrix accompanying said nth status in advance. The total difference between said input time series patterns and the reference pattern model is given by a cumulative value following said status transition of said local distance. This cumulative value is calculated for every category of the reference pattern model, and the category having the smallest cumulative value is selected as the recognition output.

The NPM according to the present invention composes said reference pattern model by learning. First, the initial values are set for the parameters of said predictor and covariance matrix accompanying each status of said finite status transition network. Next, said total distance between the learning pattern whose category is known and the reference pattern model of the same category as said category is calculated, and the parameters of the predictor and covariance matrix of each state are corrected in the direction of reducing said total distance without fail by a predetermined algorithm. This correction is repeated, and the pattern model satisfying predetermined conditions of convergence is eventually selected as the reference pattern model.

BRIEF DESCRIPTION OF THE DRAWINGS

The above-mentioned and other objects, features and advantages of the present invention will become more apparent by reference to the following detailed description of the invention taken in conjunction with the accompanying drawings, wherein.

GENERAL DESCRIPTION

Figure 1:
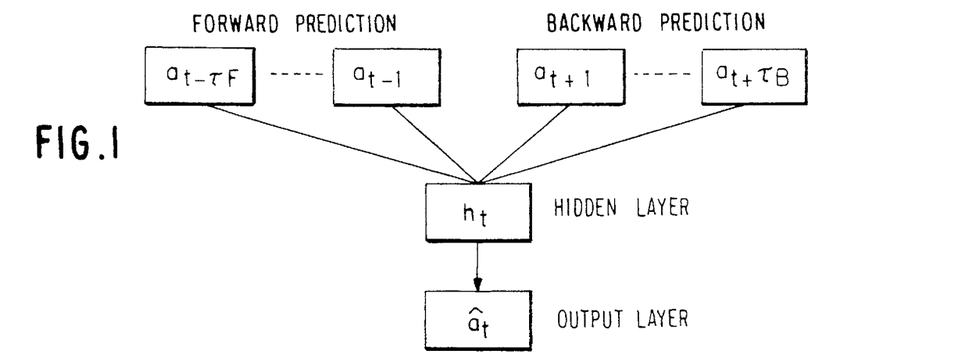
FIG. 1 illustrates the configuration of the multilayer perceptrons (MLP's) used as the predictor in the invention.

To explain the basic principle of speech recognition according to the present invention with reference to FIG. 1, said predictor used in the invention consists of MLP's. As described in detail in M. Funahashi, "On the Approximate Realization of Continuous Mappings by Neural Networks", *Neural Networks*, Vol. 2, 1989, pp. 183–192, MLP's approximate any (nonlinear) continuous function at any desired accuracy.

In the figure, the time series patterns to be inputted to the MPL's consist feature vectors $a_{t-\gamma F}, \ldots, a_{t-1}$ for "forward prediction" and $a_{t+1}, \ldots, a_{t+\gamma B}$ for "backward prediction". The latter's prediction backward on the time axis is added to the former's forward prediction to improve the predictive accuracy of the time series patterns which have close correlation backward on the time axis. As the plosive part of a plosive sound, for instance, is more closely correlated to the transitional part to the following vowel than to the closed section before the plosion, this backward prediction proves effective for plosive sounds.

The output pattern of MLP's is the predicted vector $\hat{a}_t$ for the feature vector $a_t$ of input speech at time t. This predicted vector can be represented by the following equations, using the input-output relationship of MLP's:

$$h_t = f\left( \sum_{s=1}^{\gamma_F} W_s^F a_{t-s} + \sum_{s=1}^{\gamma_B} W_s^B a_{t+s} + \Theta_1 \right) \quad (1)$$

$$\hat{a}_t = W_0 h_t + \Theta_0 \quad (2)$$

where $W_0, W_1^F, \ldots, W_{\gamma F}^F, W_1^B, \ldots, W_{\gamma B}^B$ are the matrix of coupling coefficients between the MLP units; $\Theta_0$ and $\Theta_1$, threshold vectors; and $f(\bullet)$, a vector obtained by applying the sigmoid function to each component of the subtrahend vector.

As stated above, composing a predictor of MLP's makes it possible to describe the causal relationship between proximate features vectors in the time series of speech feature vectors as a nonlinear image formed by the MLP's. The relative accuracy of the prediction can be evaluated by using the predicted vector $\hat{a}_t$, which is the output of the MLP's, and the feature vector $a_t$ of the actual input speech as the prediction residual.

Figure 2:
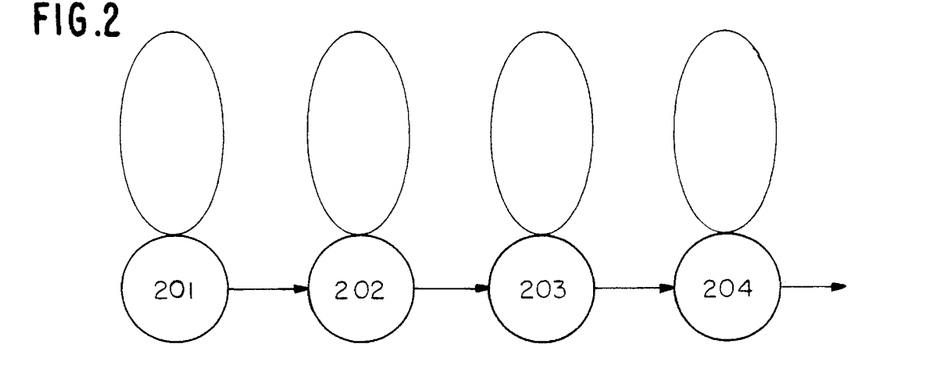
FIG. 2 illustrates the finite status transitions of an NPM, which constitutes the reference pattern model according to the invention.

An NPM which constitutes the reference pattern model of a basic unit of speech recognition, such as the word or the syllable, is represented by a transition network of finite (in this case four) statuses (finite statuses including 201 through 204), and each status consists of said predictor composed of MLP's. An NPM representing a greater unit (such as the sentence) can be composed by connecting many NPM's for basic recognition units.

Next, the recognition algorithm using the NPM's basically derives from pattern matching between input speech and a reference pattern model. The reference pattern model for discrete recognition is an NPM for a basic recognition unit, while that for continuous recognition is an NPM obtained by connecting basic unit NPMs, and in both cases it is a finite status transition network accompanied by said MLP predictor. According to the present invention, continuous recognition is accomplished by taking note of the sound elements of speech signals, and therefore of the close correlation on the time axis of said feature vectors. For this reason, said finite status transition network is composed in a left-to-right pattern as shown in FIG. 2.

The distance (local distance) $d_t(n)$ between the feature vector $a_t$ of input speech at time t and the nth status of an NPM is given by the following equation:

$$d_t(n) = (a_t - \hat{a}_t(n))^T \Sigma_n^{-1} (a_t - \hat{a}_t(n)) + \ln|\Sigma_n| \quad (3)$$

where $\hat{a}_t(n)$ is the predicted vector by the MLP predictor in the nth status and $\Sigma_n$, the covariance matrix in the nth status. The prediction residual is represented by $d_t(n)$, and $\Sigma_n$ in the equation is a quantity introduced to normalize the different extents of fluctuation of the prediction residual from component to component of the feature vector. Equation (3) can be interpreted as the logarithmic probability obtained when the probability at which the feature vector $a_t$ is observed in the nth status of the NPM is approximated by a Gaussian distribution represented by the following equation:

$$P(n|a_t) \sim \frac{1}{\sqrt{(2\pi)^c |\Sigma_n|}} \exp\left[-\frac{1}{2}(a_t - \hat{a}_t(n))^\dagger \Sigma_n^{-1}(a_t - \hat{a}_t(n))\right] \quad (4)$$

If the nondiagonal terms of the covariance matrix $\Sigma_n$ are negligibly small, equation (3) can be approximated by the following equation:

$$d_t(n) = \sum_{c=1}^{C} \frac{(a_{tc} - \hat{a}_{tc}(n))^2}{\sigma_{nc}^2} + \sum_{c=1}^{C} \ln \sigma_{nc}^2 \quad (5)$$

where subscript c represents a component of a C-dimensional feature vector, and $\sigma_{nc}^2$, the cth diagonal component of the covariance matrix $\Sigma_n$. Further, if $\sigma_{nc}^2 = 1$ (the covariance matrix is a unit matrix) here, equation (3) can be simplified into the following equation.

$$d_t(n) = \|a_t - \hat{a}_t(n)\|^2 \quad (6)$$

This equation (6) is the scale of distance used in NPM's according to the prior art, in which differences in the extent of fluctuation of the prediction residual from component to component of the feature vector are not taken into account.

The distance (global distance) D between input speech and an NPM is given by the following equation as the cumulation of local distances:

$$D = \min_{\{n_t\}} \sum_{t=1}^{T} d_t(n_t) \quad (7)$$

where $n_t$ is the identification number of the NPM which performs prediction of the feature vector of input speech at time t. The minimization in equation (7) means the selection, out of possible trajectories $n_1, n_2, \ldots, n_t, \ldots n_T$ (possible status transitions on the finite status transition network) between input speech and an NPM, of what will minimize the global distance (accumulated prediction residual) D. Where the skipless left-to-right pattern shown in FIG. 2 is to be used as the NPM, $n_t$ should satisfy the following constraints:

$$n_1 = 1 \quad (8)$$

$$n_T = N \quad (9)$$

$$n_t = n_{t-1} \text{ or } n_{t-1}+1 \quad (1 < t \leq T) \quad (10)$$

where T is the length of the feature vector time series patterns of input speech signals, and N, the number of NPM statuses (the identification number of the final status). Under these constraints, the problem of minimization can be solved by dynamic programming (DP) using the following recursion formula (for details on DP, reference may be made to H. Sakoe and S. Chiba, "Dynamic Programming Algorithm Optimization for Spoken Word Recognition", IEEE Transaction on Acoustics, Speech, and Signal Processing, ASSP-26 (1), February 1978, pp. 43–49):

$$g_t(n) = d_t(n) + \min\left\{\begin{array}{l} g_{t-1}(n) \\ g_{t-1}(n-1) \end{array}\right\} \quad (11)$$

where $g_t(n)$ is the partial sum of local distances $d_t(n)$, and the global distance D is given by the following equation.

$$D = g_T(N)$$

Figure 3:
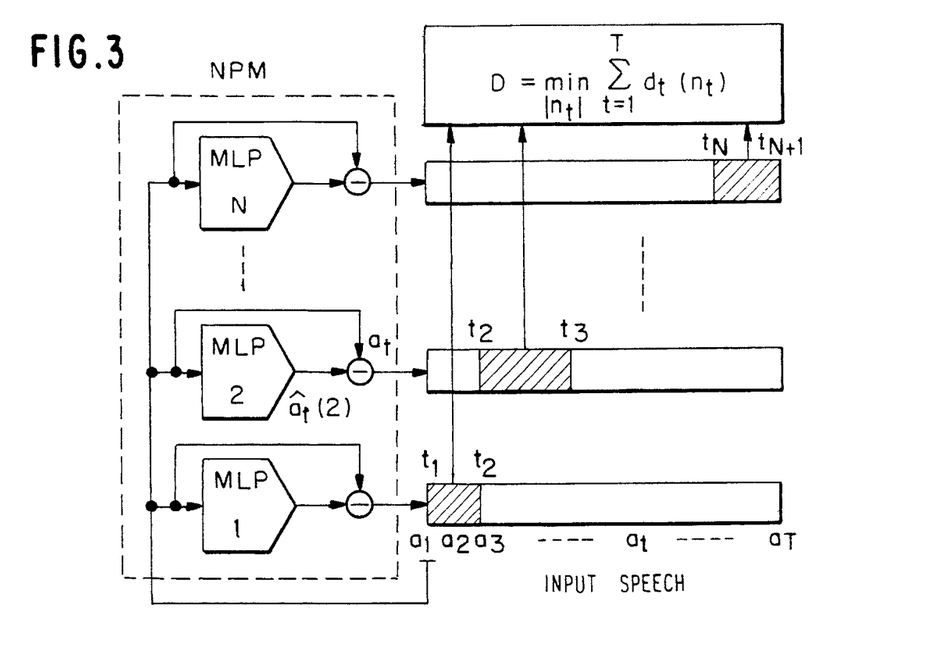
FIG. 3 illustrates the configuration of the recognition algorithm according to the invention.

By tracing back the results the optimal trajectory $\{n_t^*\}$ to minimize the accumulated prediction residual can be obtained. This information is used in the training algorithm to be described below. In recognizing continuous speech or the like, the word sequence of the recognition result can be identified from this information. FIG. 3 illustrates an outline of the recognition algorithm so far described.

Next will be described the training algorithm for automatically determining the parameters of NPM's (the weighting parameter for the neural network constituting the predictor and the parameter of the covariance matrix) by using known speech data. The purpose of training is to find out such model parameters as would minimize the aforementioned accumulated prediction residual for the speech data for training use. This can be formulated as follows as a problem of minimization having as its evaluative function the total $D_{total}$ of the accumulated prediction residual for the whole training speech data:

$$D_{total} = \sum_{m=1}^{M} D(m) \quad (13)$$

where M is the total number of the sets of training data, and D(m), the accumulated prediction residual for the m-th set of training data. D(m) can be calculated by the algorithm using DP, formulated in the preceding section. The evaluative function $D_{total}$ can be minimized in the optimal manner by the iterative algorithm stated below, combining DP and back-propagation (BP) (for more details on BP, reference may be made to R. P. Lippmann, "An Introduction to Computing with Neural Nets", IEEE ASSP Magazine, 3, 1987, pp. 4–22).

Step 1: Initialize all the NPM parameters (including the inter-unit coupling coefficient matrixes, threshold vectors and covariance matrixes of all the MLP predictors)

Step 2: m=1

Step 3: Calculate the accumulated prediction residual D(m) for the mth set of training data by DP. Seek for the optimal trajectory $\{n_t^*\}$ by back-tracking.

Step 4: t=1

Step 5: Assign a desirable output $a_t$ to the output output $\hat{a}_t(n_t^*)$ of the $n_t^*$th MLP predictor of reference patterns, and calculate the correction quantity of each parameter by BP.

Step 6: t=t+1

Step 7: If t is not greater than $T_m$ ($T_m$ is the the number of frames of the mth set of training data, return to step 5.

Step 8: m=m+1

Step 9: If m is not greater than M, return to step 3.

Step 10: Update all the NPM parameters according to the correction quantities calculated at step 5.

Step 11: If the conditions of convergence are not satisfied, return to step 2.

While parameter corrections by BP in the foregoing algorithm use the determined steepest descent method by which all the corrections are done collectively at step 10, the corrections can as well be consecutively accomplished by the random steepest descent method. Regarding the conditions of convergence at step 11, the convergence is deemed to have been achieved when, for instance, the decrement of the evaluative function $D_{total}$ drops below a certain level.

When a covariance matrix is introduced into the scale of local distances, the quantity of back-propagation error by BP requires the following correction (incidentally, the nondiagonal terms of the covariance matrix are small enough to ignore). The amount of the back-propagation error of the c-th unit of the output layer of an MLP predictor in the $n_t^*$-th status ($\delta_{ov}(n_t(n_t^*))$) is:

$$\delta_{tv}(n_t^*) = \frac{a_{tv} - \hat{a}_{tv}(n_t^*)}{\sigma^2_{n_t v}} \quad (14)$$

This differs from the amount of back-propagation error taking account of no covariance matrix by the reciprocal of variance. The estimated value of the covariance matrix is so determined as to minimize the evaluative function $D_{total}$. Thus from the following optimizing condition:

$$\frac{\partial D_{total}}{\partial \sigma^2_{nv}} = 0 \quad (15)$$

is derived the following estimation formula (revaluation formula, for use at step 10) of the covariance matrix:

$$\sigma^2_{nv} = \frac{\sum_{m=1}^{M} \sum_{t=1}^{T_m} \delta_{nn_t^*}(a_{tv} - \hat{a}_{tv}(n_t^*))^2}{\sum_{m=1}^{M} \sum_{t=1}^{T_m} \delta_{nn_t^*}} \quad (16)$$

where $T_m$ is the number of frames of the m-th set of training data, $\delta_{nn*_t}$, a Kronecker delta.

$$\delta_{mn} = \begin{cases} 1 \text{ if } m = n \\ 0 \text{ otherwise} \end{cases} \quad (17)$$

The convergence of the foregoing iterative training algorithm can be proven in the following way. Thus, the value $D_{total}^{(k)}$ of the evaluative function in the k-th iteration before the parameter correction (immediately before step 10) is the sum of prediction residuals accumulated according to the optimal (accumulated prediction residual minimizing) trajectory $\{n_t^*\}$ determined by DP for each set of training data. The sum of prediction residuals accumulated according to the same trajectory after the parameter correction at step 10 is represented by $$D_{total}^{(k, BP)}.$$

Whereas the parameter correction by BP here is so accomplished as to reduce the squared error in the output layer of each MLP predictor, in the case of NPM, where this squared error is identical with the prediction residual, the accumulated prediction residual is reduced without fail by the parameter correction. (Revaluation of the covariance matrix is considered together with BP.)

$$D_{total}^{(k, BP)} \leq D_{total}^{(k)}. \quad (18)$$

However, when the parameters are corrected by BP, the optimality of the optimal trajectory achieved at step 3 is lost. Therefore, the optimal trajectory is sought for the model parameters corrected by DP in the k+1-th iteration. Since DP gives the optimal trajectory to minimize the accumulated predictor residual:

$$D_{total}^{(k+1)} \leq D_{total}^{(k, BP)} \quad (19)$$

formulas 18 and 19 eventually indicate that the evaluative function is monotonously reduced by iteration.

$$D_{total}^{(k+1)} \leq D_{total}^{(k)} \quad (20)$$

Qualitatively it can be understood that the reason why this iterative algorithm converges is that DP and BP are minimization methods for the same evaluative function (the accumulated sum of prediction residuals) and they are consecutively applied.

DETAILED DESCRIPTION

The present invention will be described in further detail below with reference to FIGS. 4 to 6 which are the flow charts of recognition by the speech recognition method according to the invention, FIG. 7 which is a flow chart of reference pattern learning by the speech recognition method according to the invention and FIG. 8 which is a block diagram of a speech recognition apparatus according to the invention.

Figure 8:
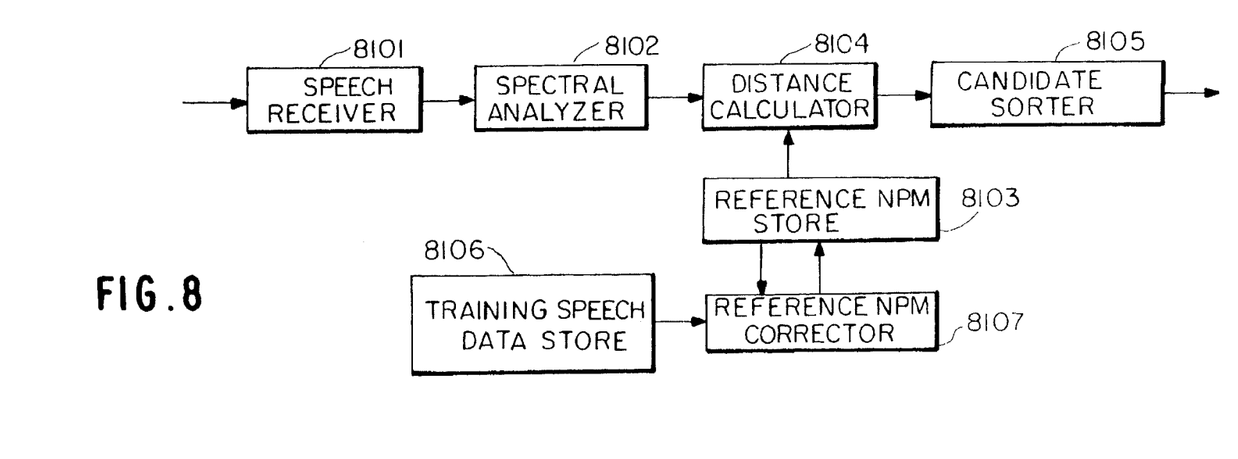
FIG. 8 is a block diagram of a speech recognition apparatus which is a preferred embodiment of the invention.

A speech input unit 8101 in FIG. 8, consisting of a microphone, an amplifier and an analog-to-digital (A/D) converter among other things, digitalizes speech signals representing speech sounds uttered by the user and supplies them to the following acoustic analyzer 8102. The acoustic analyzer 8102 subjects these digitalized speech signals to spectral analysis by FFT or the like, and converts them into a time series pattern of feature vectors. The spectral analysis can be accomplished by linear predictive coding (LPC) or the cepstrum method besides FFT.

A reference pattern storage section 8103 stores the parameters of the reference pattern models of all the word categories which are the objects of recognition. If, for instance, 10 numerals are to be recognized, the parameters of the reference pattern model of each of the numerals from 0 through 9 are stored. The reference pattern model of each category here is a finite status transition network each of whose statuses is accompanied by an MLP predictor.

What are stored in the storage section 8103 are the parameters of the MLP predictors of different statuses and the covariance matrixes of the respective statuses. Where MLP predictors each having one hidden layer, as shown in FIG. 1, are used, the parameters are $\tau_F$ inter-unit coupling coefficient matrixes $W_i^F, \ldots, W_{\tau F}^F$ (each matrix consists of H rows by C columns, where C is the number of hidden layer units and C is the number of dimensions of the feature vector) for forward prediction, $\tau_B$ inter-unit coupling coefficient matrixes $W_i^B, \ldots, W_{\tau B}^B$ (each matrix consists of H rows by C columns) for backward prediction, an inter-unit coupling coefficient matrix W (consisting of C rows by H columns), the threshold vector $\Theta_i$ of the hidden layer (H-dimensional vector), and the threshold vector $\Theta_o$ of the output layer (C-dimensional vector). Each covariance matrix is a symmetric one of C rows by C columns, and the number of independent components is C(C+1)/2.

A distance calculator 8104 calculates the distance between the feature vector time series pattern given from the acoustic analyzer 8102 and the reference pattern model of each of the aforementioned categories, and supplies the result of calculation to a recognition result output section 8105. The distance between the feature vector time series pattern of input speech and the reference pattern model is the global distance D defined by the above cited equation (7). The method of calculation is given by the flow from steps 401 to 414 in FIG. 4. In FIG. 4, t is a variable representing the time axis of the feature vector time series pattern of input speech, and takes one of integral values from 1 through T; s is a variable representing the category of the objects of recognition, and takes one of integral values from 1 through S—where the objects of recognition are 10 numerals, s=10; n is a variable representing the status of the reference pattern model of each category, and takes one of integral values from 1 through $N^{(s)}$ ($N^{(s)}$ is the number of status of the reference pattern model of category s); $d_t^{(s)}(n)$ is a variable for storing the local distance between the n-th status of category s and the feature vector $a_t$ of input speech at time t; and $g_t^{(s)}(n)$ is a variable for storing the accumulated prediction residual of the n-th status of category s at time t.

At step 401, the variables are initialized in order to calculate the global distance D of equation (7) by DP. Referring to FIG. 5 illustrating this step 401 in detail, a counter is initialized at steps 501 to 503. At step 504, the storage areas for the local distance $d_{st}(n)$ and the accumulated prediction residual $g_{st}(n)$ are initialized. At steps 505 to 510, the increment and conditions of the counter are judged, and the initialization at step 504 is applied with respect to all the values of s, t and n. Then, at steps 511 to 514, the value at the start point of the accumulated prediction residual of each category s is set.

Figure 6:
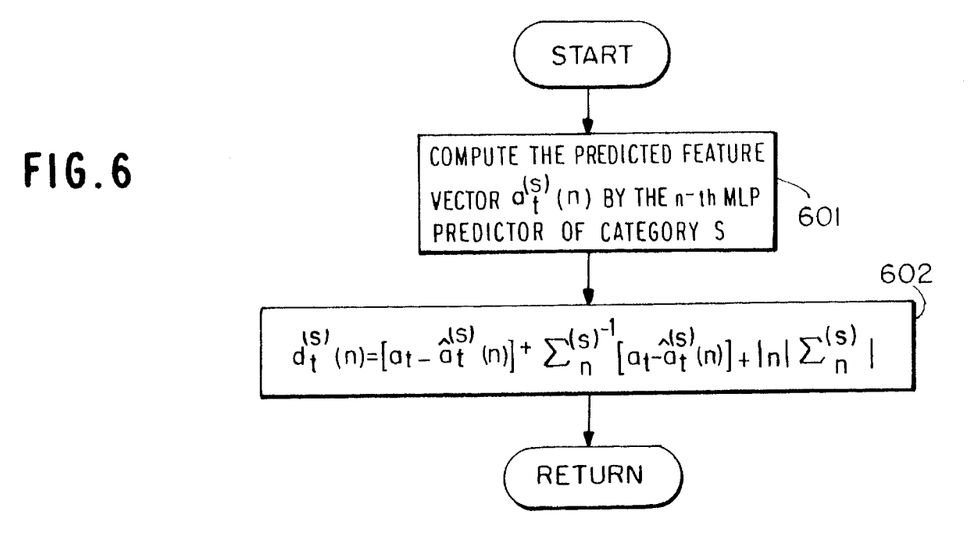
FIG. 6 is a detailed flow chart of the local distance calculation in FIG. 4.
Figure 9:
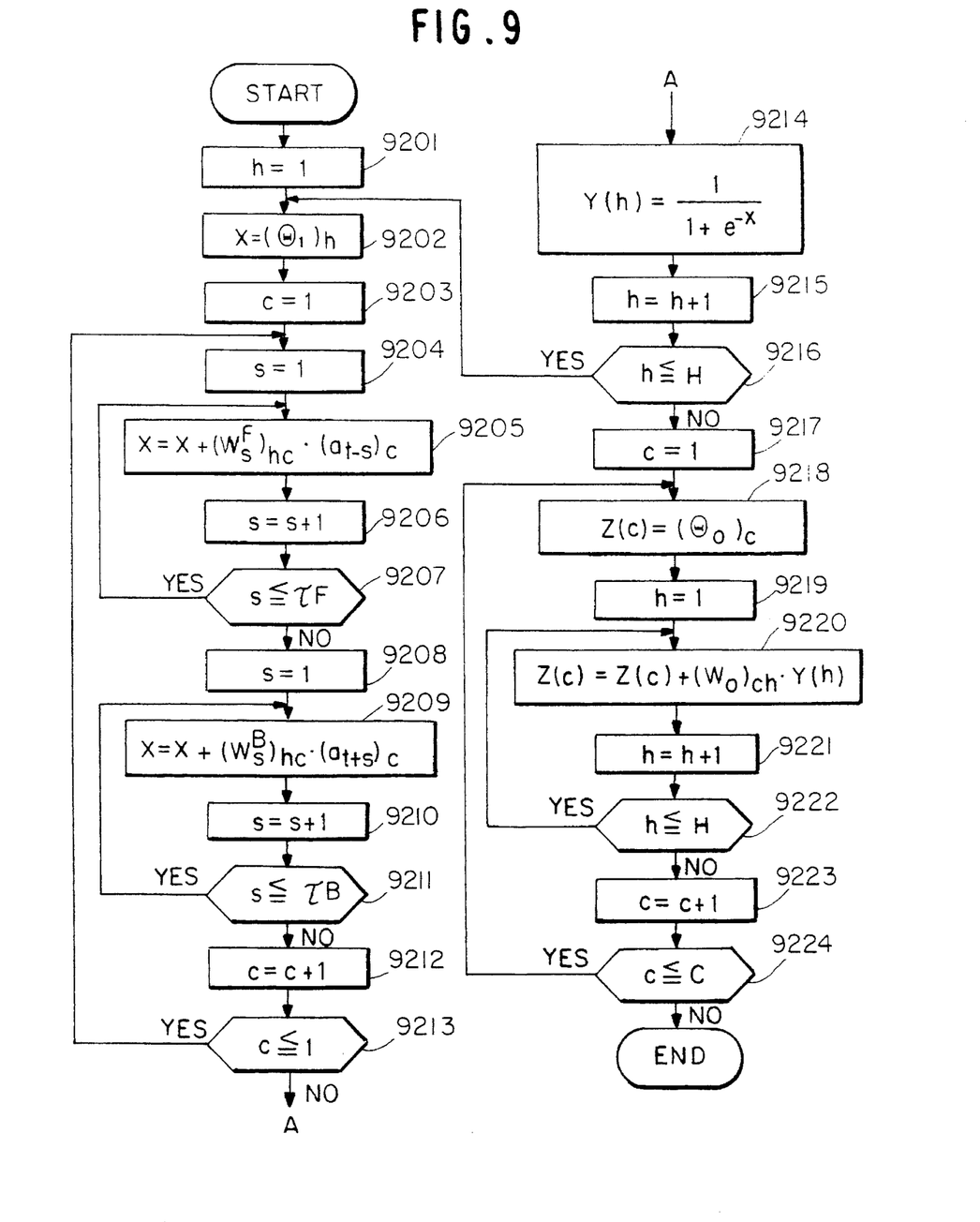
FIG. 9 is a detailed flow chart of predicted vector calculation at step 601 in FIG. 6.

Next, referring to FIG. 6 illustrating step 405 for calculating the local distance in detail, at step 601, an MLP predictor accompanying the n-th state of category s calculates the predicted vector $\hat{a}_t$ to be compared with the input speech feature vector $a_t$ at time t. In FIG. 9 which shows in further detail this calculation represented by the above cited equations (1) and (2), X is a scalar variable; Y, the arrangement in the H-dimension (Y(h) is the h-th element); Z, the arrangement in the C-dimension (Z(c) is the c-th element); H, the number of hidden layer units; and C, the number of dimensions of the feature vector. Further, $(\Theta_1)_h$ at step 9202 is the h-th component of the threshold vector $\Theta_1^1$; $(W_s^F)_{hc}$ at step 9205 is the element on the h-th row and the c-th column of the coupling coefficient matrix $W_s^F$; $\tau_F$ and $\tau_B$ represent the numbers of feature vectors of input speech used for the aforementioned forward prediction and backward prediction, respectively, $\tau_F=2$ and $\tau_B=1$ being used, to be specific. The calculation shown in FIG. 9 gives the predicted vector $\hat{a}_t$ as a vector arrangement Z having C components.

Figure 10:
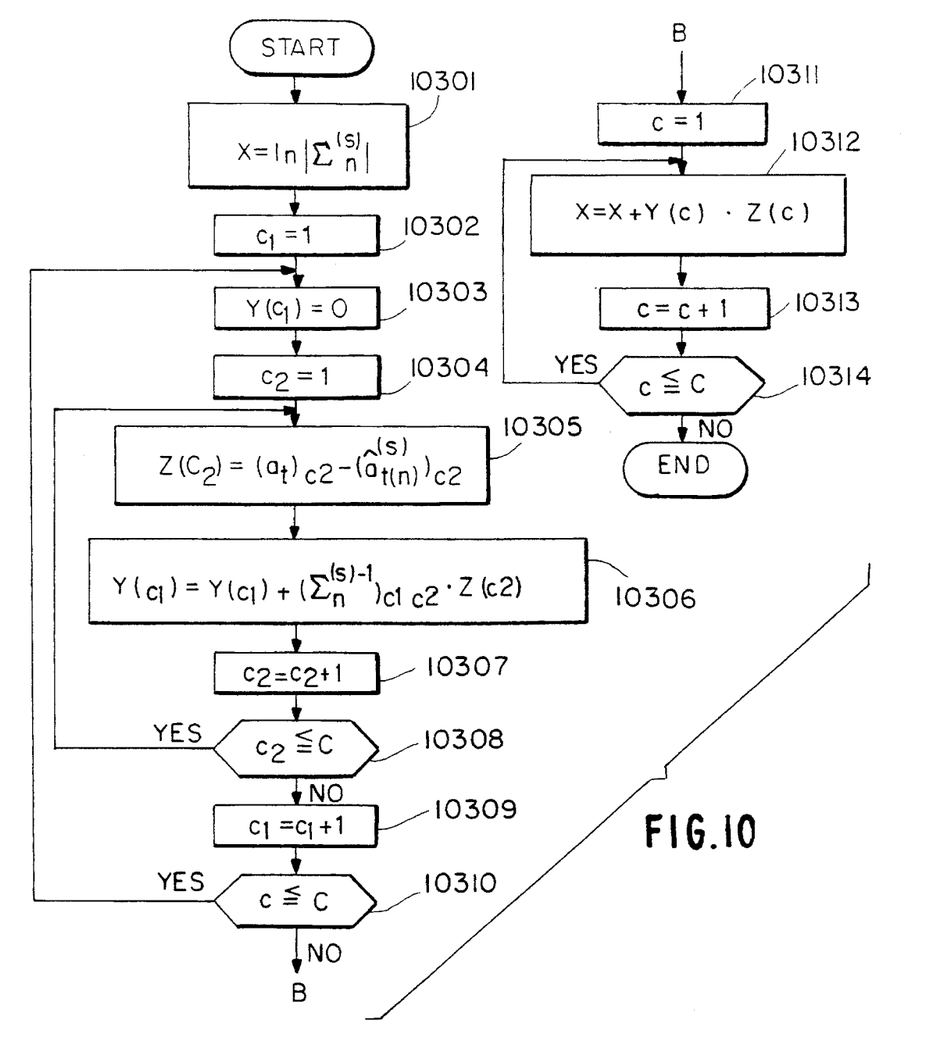
FIG. 10 is a detailed flow chart of local distance calculation at step 602 in FIG. 6.

Next, referring further to FIG. 6, at step 602 is calculated the distance $d_t^{(S)}(n)$ from the input speech feature vector $a_t$ at time t and the predicted vector $\hat{a}_t$ by the MLP predictor accompanying the n-th status of category, calculated at step 601. At step 10301 of FIG. 10 which shows in further detail this calculation represented by the above cited equation (3), $|\Sigma_n^{(S)}|$ is the determinant of the covariance matrix in the n-th state of category s. The method to calculate the determinant is not explained here as it is evident from elementary linear algebra. At step 10301, the natural logarithm of the determinant of the covariance matrix is substituted for a variable X. Variables Y and X in FIG. 10 are both arranged in the C-dimension. At step 10305, $(a_t)_{c2}$ is the c-th component of the input speech feature vector $a_t$, and $(a_t^{(S)}(n))_{c2}$ is the predicted vector by the MLP predictor accompanying the n-th state of category s, both calculated at step 601. At step 10306, $(\Sigma_n^{(S)-1})_{c1c2}$ is the component on the $c_1$-th row and the $c_2$-th column of the inverse matrix of the covariance matrix $\Sigma_n^{(S)}$. The method to calculate the inverse matrix is not explained here as it is evident from elementary linear algebra. Processing illustrated in FIG. 10 stores the value of the local distance $d_t^{(S)}(n)$ into the variable X.

Figure 4:
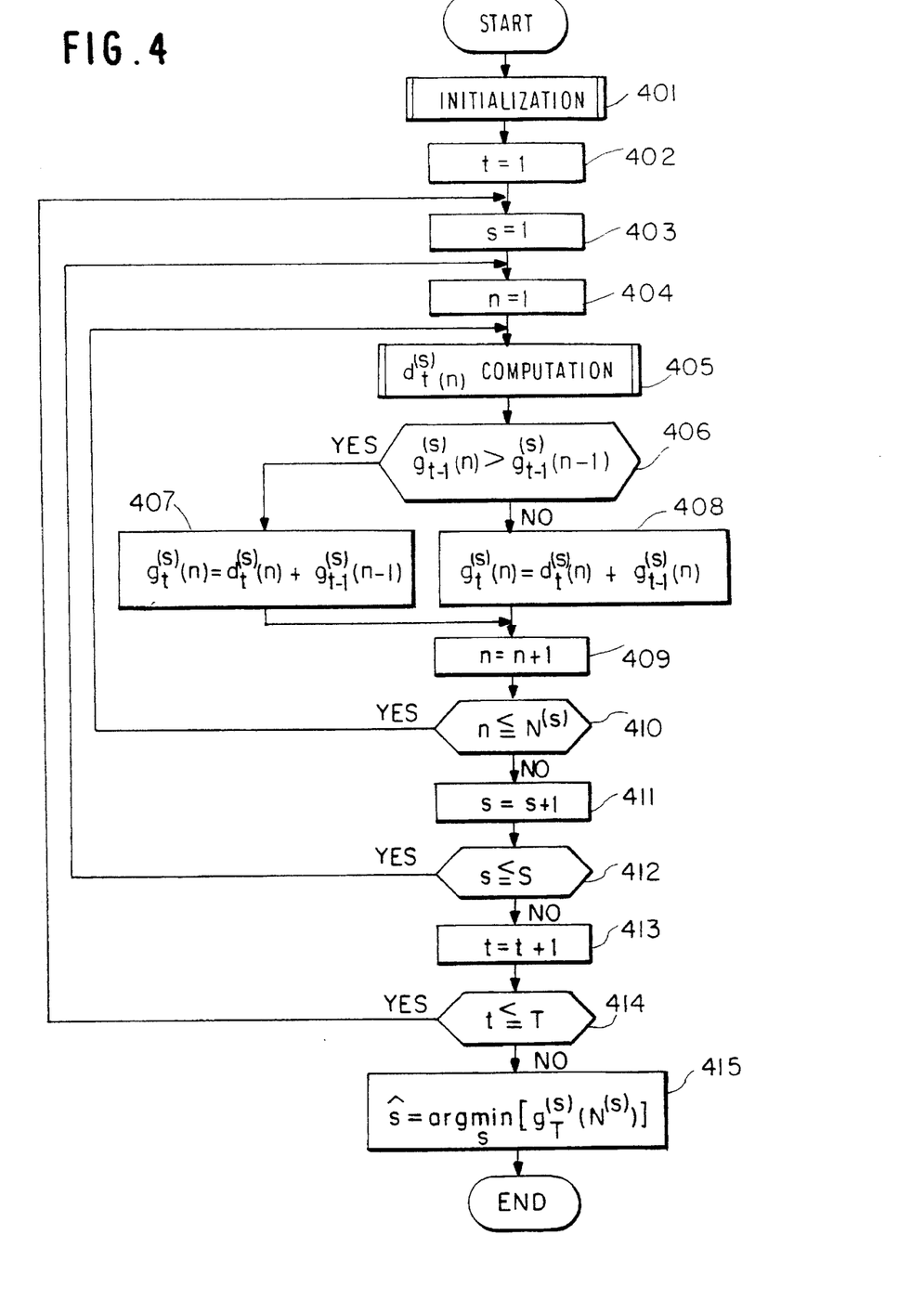
FIG. 4 is a recognition flow chart illustrating the pattern recognition method according to the invention.
Figure 5:
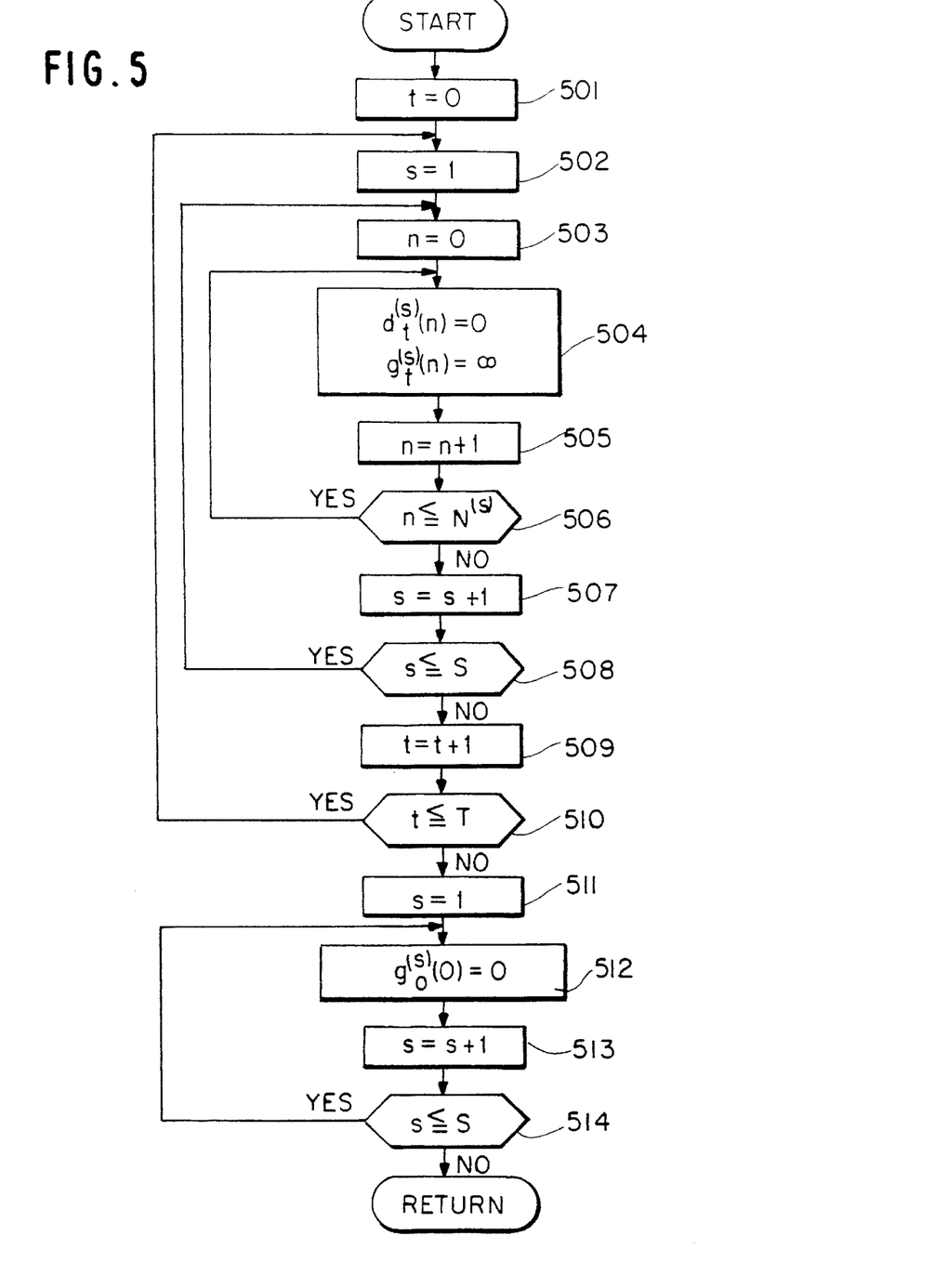
FIG. 5 is a detailed flow chart of the initializing section of FIG. 4.

By the processing up to step 414 in FIG. 4, the global distance D between the feature vector time series pattern of input speech and the reference pattern model is calculated. At this time, the global distance D between the above mentioned patterns of category s is obtained as the accumulated prediction residual $g_T(N^{(S)})$ of the final status $N^{(S)}$ of each reference pattern model at time T (the terminal point of one time series pattern).

The recognition result output section 8105 selects the shortest of the distances between the feature vector time series pattern of input speech and the reference pattern model of each category given from the distance calculator 8104, and supplies its category name as the recognition result. Its specific processing is step 415 in FIG. 4.

A training speech database storage section 8106 stores the speech data of all the word/syllable categories which are the objects of recognition, i.e. the time series patterns of feature vectors corresponding to each category.

A reference pattern corrector 8107 calculates the quantities of correction required for the parameters of the reference pattern model of each category read in from the reference pattern storage section 8103 on the basis of training speech data from the training speech database storage section 8106, and corrects the aforementioned parameters corresponding to the reference patterns stored in the reference pattern storage section 8103.

Figure 7:
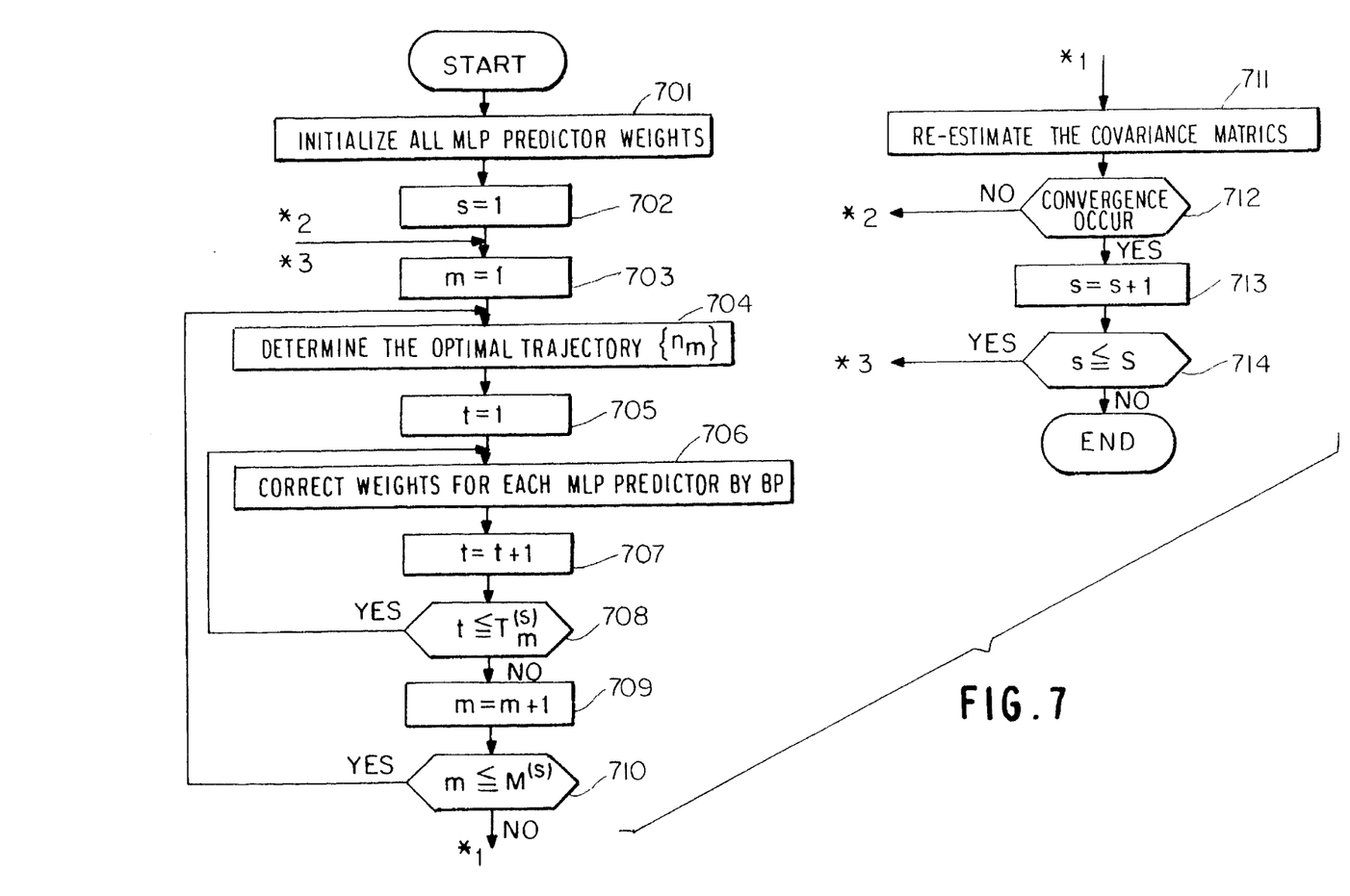
FIG. 7 is a flow chart illustrating the reference pattern learning method according to the invention.
Figure 11:
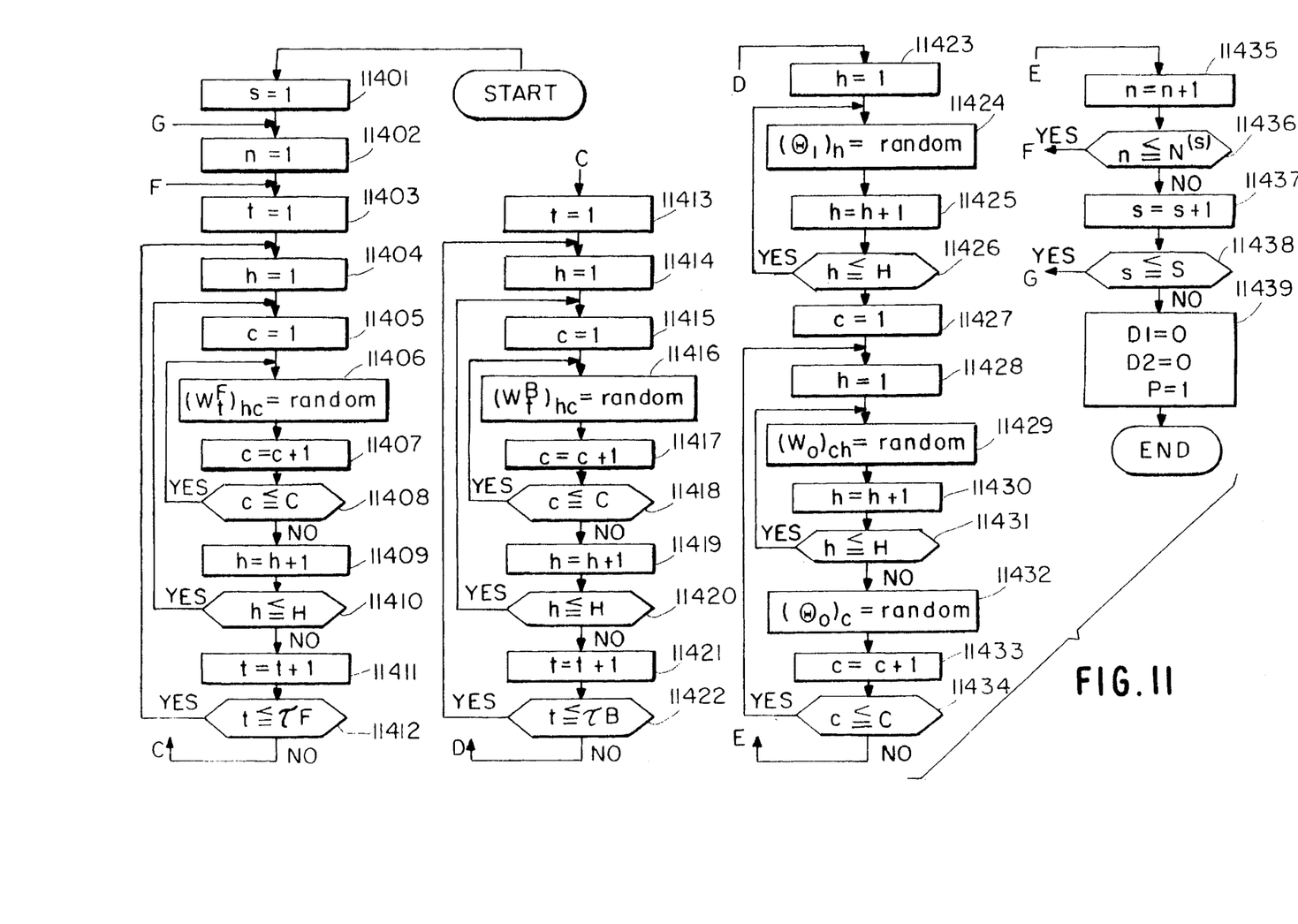
FIG. 11 is a detailed flow chart of initializing at step 701 in FIG. 7.

Referring to FIG. 7 illustrating that signal processing, the parameters of the reference pattern models of all the categories (including the inter-unit coupling coefficients of MLP predictors in different statuses, threshold vectors and covariance matrixes) are initialized with random numbers at step 701. This processing is illustrated in detail in FIG. 11. Here, s is a variable representing the category of the object of recognition, and takes, where 10 numerals are to be recognized, one of integral values from 1 through 10; and n is a variable representing the n-th status of the reference pattern model of the s-th category, and takes one of integral values from 1 through $N^{(S)}$. At step 11406, $(W_t^F)_{hc}$ is the element on the h-th row and the c-th column of the t-th inter-unit coupling matrix $W_t^F$ for forward prediction of the MLP predictor accompanying the n-th status of the reference pattern model of the s-th category. Here, "random" denotes random numbers, which specifically are uniform random numbers ranging from −0.3 to 0.3. Similarly at the following steps 11416, 11424, 11429 and 11432, the object parameter is supposed to be the parameter of the n-th status of the reference pattern model of the s-th category. At step 11439 are initialized variables D1 and D2, to be subsequently used for convergence decision at step 712, and another variable P.

Figure 12:
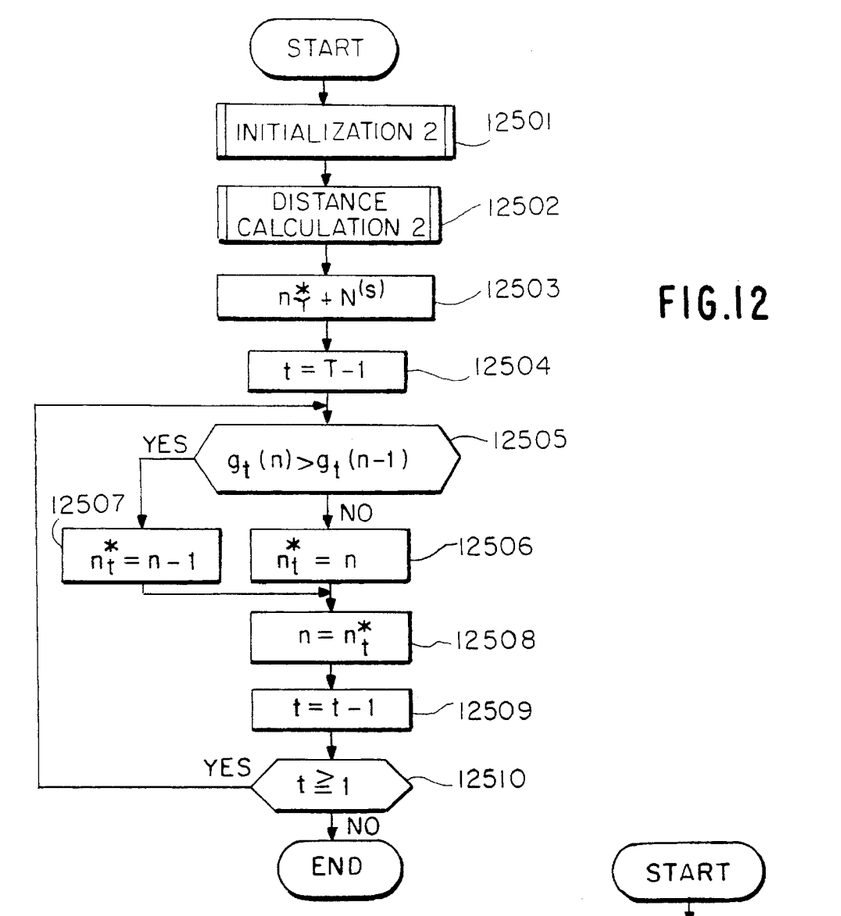
FIG. 12 is a detailed flow chart of optimal trajectory calculation at step 704 in FIG. 7.

At step 704, the optimal trajectories between the m-th set of training data of the s-th category (the feature vector time series of $T_m^{(S)}$ in length) and the reference pattern models of the s-th category are figured out. Details of this processing are shown in FIG. 12. The initializing section 2 of step 12501 results from the fixing of the variable s representing the category to be processed in the initialization given in FIG. 4 (step 401). More specifically, this processing is achieved by eliminating steps 502, 507, 508, 511, 513 and 514 of FIG. 5. The distance calculating section 2 of step 12502 results from the fixing of the variable s representing the category to be processed in the distance calculating process from steps 402 through 414 given in FIG. 4. More specifically, this processing is accomplished by removing steps 403, 411 and 412. For subsequent convergence decision, the accumulated prediction residual $g_T^{(S)}(N^{(S)})$ calculated by the processing up to step 414 is added in advance to the variable D1 for convergence decision (D1=D1+$g_T^{(S)}(N^{(S)})$). The optimal trajectories $n_1, \ldots, n_T$ are obtained by the processing from steps 12503 through 12510.

Figure 13:
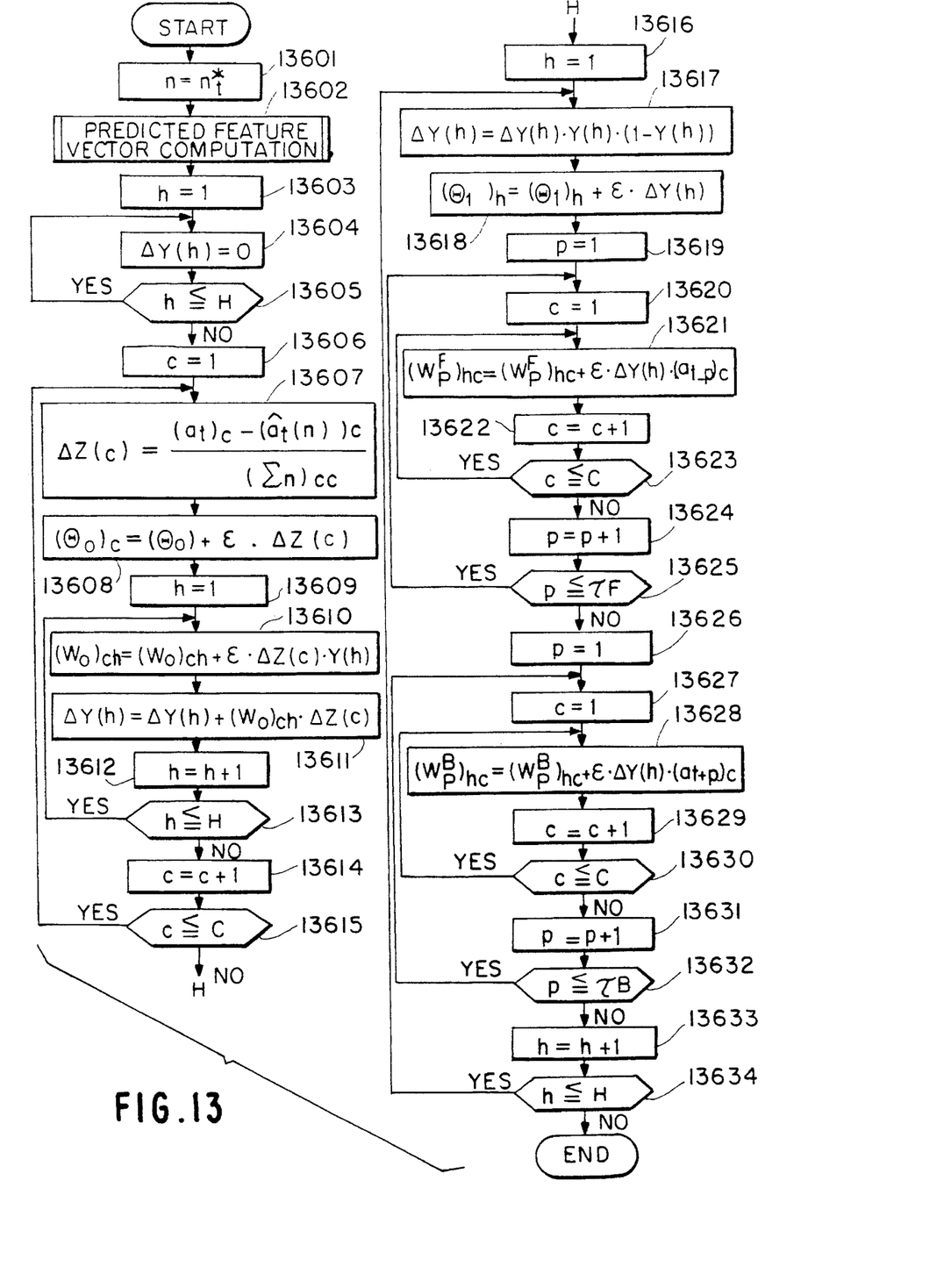
FIG. 13 is a detailed flow chart of the calculation of the quantities of parameter correction at step 706 in FIG. 7.

Referring again to FIG. 7, at step 706, the parameters of the MLP predictor accompanying the $n_t^*$-th status, given correspondence at step 704 to the feature vector $a_t$ of the m-th set of training data of the s-th category at time t, are corrected by back propagation. Details of this processing are shown in FIG. 13. At step 13602 is calculated the predicted vector for the feature vector $a_t$ at time t. This process is shown in FIG. 9 (referred to above). In the processing at the following steps 13603 through 13634, Y is an H-dimensional arrangement representing the output of the hidden layer unit calculated at step 13602; ΔZ, a C-dimensional arrangement representing the error regarding the output layer unit; ΔY, an H-dimensional arrangement representing the error regarding the hidden layer unit; and ε, a learning coefficient given in advance (specifically taking the value of 0.1 or the like). Here, the nondiagonal terms of the covariance matrix are negligibly small, and the matrix accordingly is treated as a diagonal one, whose c-th diagonal component is $(\Sigma_n)_{cc}$ at step 13607. By the processing shown in FIG. 13, the parameters of the $n_r^*$-th MLP predictor of the s-th category are so corrected as to reduce the prediction residuals. By the processing from steps 703 through 710, the above described corrective training is applied to all the sets of training data of the s-th category.

Figure 14:
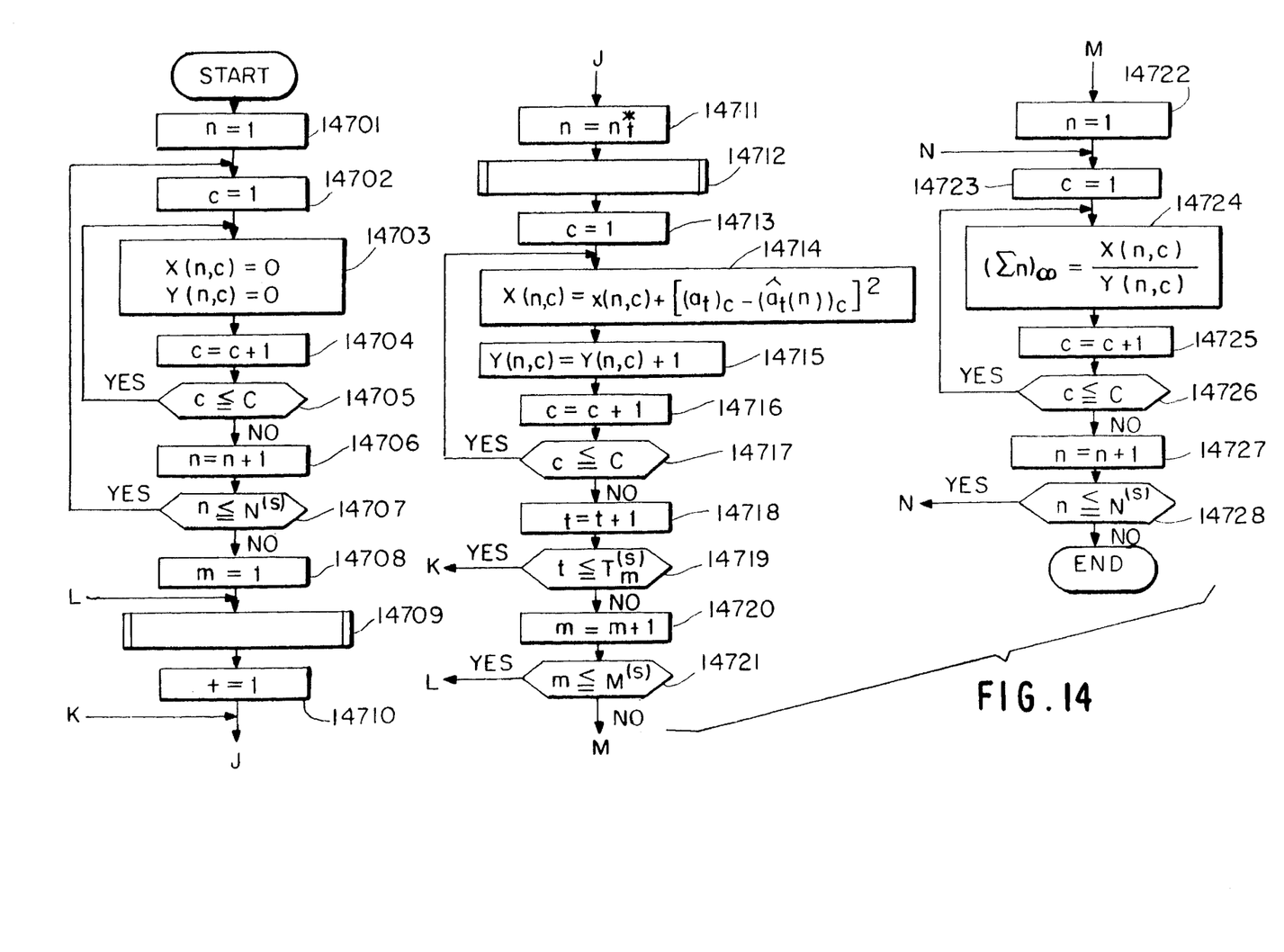
FIG. 14 is a detailed flow chart of covariance matrix calculation at step 711 in FIG. 7.

At step 711, a new covariance matrix is calculated on the basis of equation (16) cited above. The process at step 711 is illustrated in FIG. 14, wherein variables X and Y are arrangements of $N^{(S)}$ rows and C columns, respectively. The optimal trajectory calculation at step 14709 is processed in the same manner as step 704, as shown in detail in FIG. 12. Processing by the predicted vector calculating section at step 14712 is the same as step 13602, whose details are shown in FIG. 9. The sign ($\hat{a}_r(n)$) at step 17414 denotes the c-th component of the predicted vector calculated at step 14712, and $(\Sigma_n)_{cc}$ at step 14724, the c-th diagonal component of the the covariance matrix of the n-th status.

Figure 15:
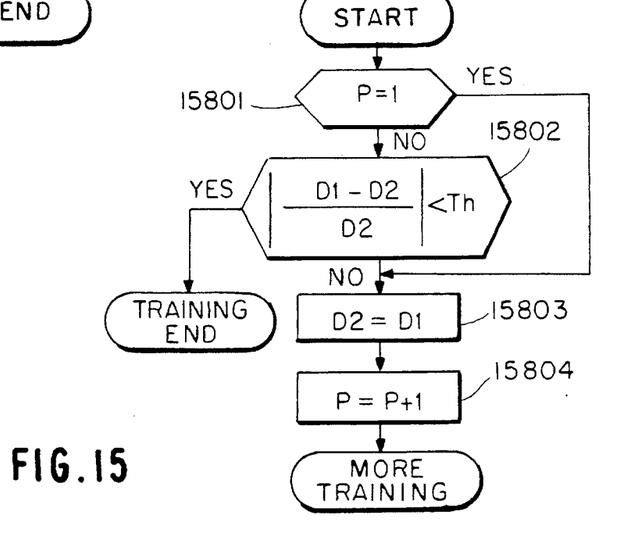
FIG. 15 is a detailed flow chart of convergence decision at step 712 in FIG. 7.

Conversion decision at step 712 recognizes convergence if the calculated varying rate of the variable D1 (the accumulated prediction residual for all the sets of training data) is found smaller than a threshold given in advance. The processing is shown in FIG. 15. At step 15802, the absolute value of the varying rate of the accumulated prediction residual for all the sets of training data is compared with a threshold $T_h$ given in advance (actually 0.001 or the like). By the processing at these steps 701 through 417, iterative training is carried out for all the sets of training data to give the optimal model parameters.

As hitherto described, the speech recognition method according to the present invention is characteristic in that finite status transition networks of the left-to-right pattern accompanied by MLP predictors using neural networks compose NPM's, which are reference pattern models involving both forward and backward prediction, the local distances between these NPM's and the time series patterns of input speech feature vectors are calculated by DP matching, and covariance matrixes are introduced into this calculation of local distances. As a result, the speech recognition method according to the invention is adaptable to the speech of any unspecified speaker and makes possible speech recognition, in particular continuous speech recognition, at a high rate of recognition.

Although the invention has been described with reference to a specific embodiment (or specific embodiments), this description is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any such modifications or embodiments as fall within the true scope of the invention.

What is claimed is:

1. A pattern recognition method for recognizing syllables and sound elements on the basis of the comparison of input time series patterns expressed as feature vectors of the syllables and sound elements with reference pattern models using a finite status transition network, in which each status of said finite status transition network has a predictor, comprising the steps of:

(a) calculating, in each predictor, a predicted feature vector at time t from a plurality of input feature vectors between time (t−1) and time (t−$\tau_F$) and a plurality of input feature vectors between time (t+1) and time (t+$\tau_B$), wherein said $\tau_B$ and $\tau_F$ are predetermined natural number;

(b) determining a local distance at every t between said input feature vectors and t-th status of said finite transition network by using said input feature vectors, said predicted feature vector and a covariance matrix which accompanies t-th status of said finite status transition network;

(c) calculating an accumulated value of said local distances for every reference pattern defined by said status of said finite state transition network;

(d) detecting a minimum of said accumulated values for every reference pattern; and (e) outputting a category of the reference pattern corresponding to said minimum as a recognition result.

2. A speech recognition method, as claimed in claim 1, wherein initial values are set for the parameters of said predictor and said covariance matrix accompanying each status of said finite status transition network, said local distance between said input time series pattern, category of which is known, and said reference pattern model corresponding to the same category as said known category is calculated; the parameters of said predictor and said covariance matrix of each state are iteratively corrected by using a gradient descent method; and said reference pattern model said local distance for which satisfies predetermined conditions of convergence is thereby obtained.

\* \* \* \* \*